United States Patent
Huynh

[11] Patent Number: 6,148,967
[45] Date of Patent: Nov. 21, 2000

[54] NON-CONTACTING AND TORQUER BRAKE MECHANISM

[75] Inventor: Co Si Huynh, Glendale, Calif.

[73] Assignee: AlliedSignal Inc., Morristown, N.J.

[21] Appl. No.: 09/113,613

[22] Filed: Jul. 10, 1998

[51] Int. Cl.[7] .................................................. B60L 7/00
[52] U.S. Cl. ............................ 188/164; 188/161; 188/162
[58] Field of Search ............................ 188/158, 159, 188/161, 162, 164

[56] References Cited

U.S. PATENT DOCUMENTS

| | | |
|---|---|---|
| 2,939,023 | 5/1960 | Fehr . |
| 3,382,384 | 5/1968 | Hulls . |
| 4,864,173 | 9/1989 | Even ........................................... 310/93 |
| 5,234,083 | 8/1993 | Lee ............................................ 188/267 |
| 5,303,802 | 4/1994 | Kuwahara ................................. 188/158 |
| 5,337,862 | 8/1994 | Kuwahara ................................. 188/158 |
| 5,465,815 | 11/1995 | Ikegami .................................... 188/164 |

FOREIGN PATENT DOCUMENTS

| | | |
|---|---|---|
| LU 40 380 | 11/1961 | France . |
| 04372566 | 6/1991 | Japan . |

*Primary Examiner*—Robert J. Oberleitner
*Assistant Examiner*—Devon Kramer
*Attorney, Agent, or Firm*—William J. Zak, Jr., Esq.

[57] ABSTRACT

A brake mechanism includes an inner assembly secured to a motor shaft and an outer assembly surrounding the inner assembly. The outer assembly includes a permanent magnet or an electromagnet between a pair of ferromagnetic pole structures. The inner assembly also includes a pair of ferromagnetic pole structures. During operation of the brake mechanism, the inner assembly is rotated relative to the outer assembly, and the pole structures cause a magnetic field within the inner assembly to pulsate. The pulsating magnetic field causes the inner assembly to apply a braking torque to the shaft.

20 Claims, 3 Drawing Sheets

NON-CONTACTING AND TORQUER BRAKE MECHANISM

BACKGROUND OF THE INVENTION

The present invention relates generally to brake mechanisms.

Cargo roller assemblies are commonly used for transporting luggage, freight and other loads within aircraft cargo bays. A typical cargo roller assembly includes a number of power drive units that are distributed throughout a cargo bay. Each power drive unit typically includes an electric motor having a shaft that drives a transmission, which propels the loads within the cargo bay.

The power drive unit may also include a friction brake for braking and holding the motor shaft. When the brake is applied, a brake pad is pressed against a rotor that is secured to the motor shaft. Through friction, the motor shaft is brought to a rest and held in place.

There are problems associated with such a friction brake. The brake pad wears and tears with continual use. The wear and tear results in periodic maintenance of the brake and replacement of the brake pad.

As the brake pad wears and tears, it generates brake debris. The brake debris can contaminate bearings that support the motor shaft and cause the bearings to fail.

SUMMARY OF THE INVENTION

The present invention can be regarded as a brake and torquer mechanism including an inner assembly and an outer assembly surrounding the inner assembly. The inner assembly includes a pair of inner ferromagnetic pole structures. Each inner pole structure includes a plurality of inner salient ferromagnetic poles extending radially outward. The outer assembly includes a pair of outer salient ferromagnetic pole structures. Each outer pole structure includes a plurality of outer salient ferromagnetic poles extending radially inwards towards the inner assembly. One of the inner and outer assemblies further includes a flux source between its pole structure pair; and the other of the inner and outer assemblies further includes a ferromagnetic bridge between its pole structure pair. Magnetic air gaps are defined by outer surfaces of the inner and outer poles when the outer surfaces of the inner and outer poles are in opposing relationships.

Because the brake mechanism is non-contacting, problems such as brake wear and tear and maintenance are reduced or eliminated altogether. The brake mechanism may be applied to many different systems, such as a power drive unit of a cargo roller assembly. Because brake debris is not generated, the bearings of the power drive unit will not fail due to brake debris contamination.

DETAILED DESCRIPTION OF THE INVENTION

Figure 1:
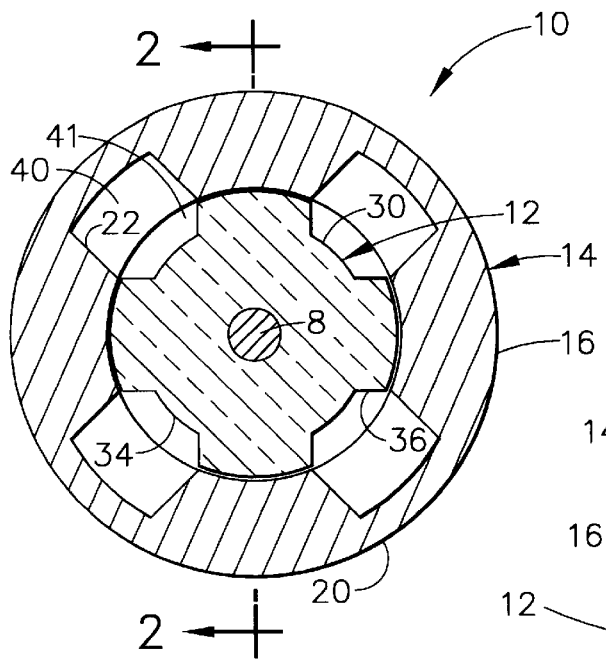
FIG. 1 is an illustration of a brake mechanism according to the present invention.
Figure 2:
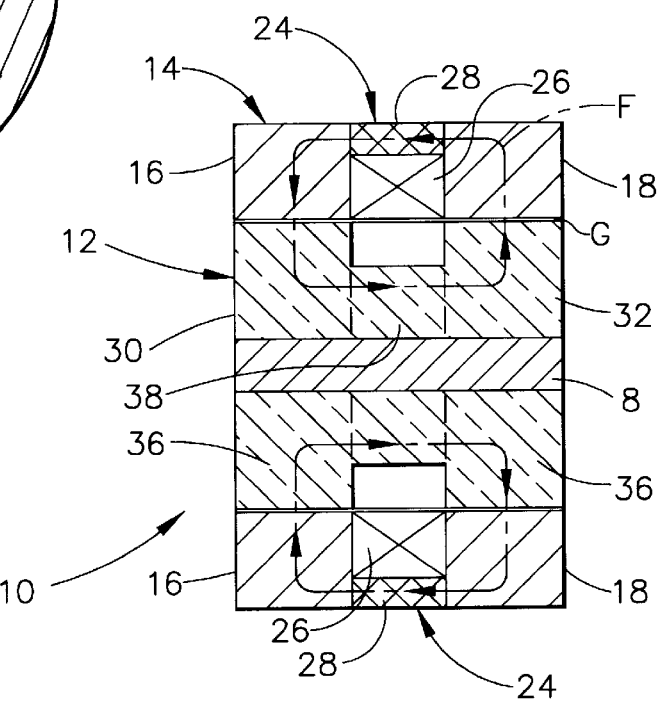
FIG. 2 is an illustration of a cross-section of the brake mechanism shown in FIG. 1, the cross-section being taken along lines 2—2 in FIG. 2.

Reference is initially made to FIGS. 1 and 2, which show a non-contacting brake and torquer mechanism 10 for applying a braking torque to a shaft 8 such as the shaft of an electric motor. The brake mechanism 10 includes an inner assembly 12 secured to the shaft 8 and an outer assembly 14 surrounding the inner assembly 12. The outer assembly 14 includes a pair of outer pole structures 16 and 18 that are identical. Each outer pole structure 16 and 18 includes a ferromagnetic disc 20 and a plurality of outer salient ferromagnetic poles 22 extending radially inward from an inner perimeter of the ferromagnetic disc 20.

The outer assembly 14 further includes an electromagnet 24 between the outer pole structures 16 and 18. The electromagnet 24 includes an annular bobbin and a coil 26 wound around the bobbin. The bobbin is made of a non-magnetic material such as plastic. The electromagnet 24 also includes an annular outer ferromagnetic bridge 28 surrounding the coil 26. The outer bridge 28 functions as a yoke to provide a magnetic flux path between the outer pole structures 16 and 18.

The inner assembly 12 includes a pair of inner pole structures 30 and 32 that are identical. Each inner pole structure 30 and 32 includes an inner ferromagnetic disc 34 and a plurality of inner salient ferromagnetic poles 36 extending radially outward from an outer perimeter of the inner disc 34. The inner assembly 12 further includes an inner annular ferromagnetic bridge 38 between the inner pole structures 30 and 32.

Dashed lines are shown to distinguish the inner pole structures 30 and 32 from the inner bridge 38. These inner structures 30, 32 and 38 may be fabricated as separate components and assembled together, or they may be fabricated as a single solid structure.

The inner assembly 12 is secured to the shaft 8. This can be done in any number of ways. For example, the shaft 8 may extend through a through-hole in the inner assembly 12 and may be secured to the inner assembly 12 by means such as a tie-bolt. The inner assembly 12 is rotatable relative to the outer assembly 14.

The inner assembly 12 has a pole configuration that matches the pole configuration of the outer assembly 14. Outer surfaces of the inner and outer poles 36 and 22 define magnetic air gaps G when the outer surfaces of the inner and outer poles 36 and 22 are in opposing relationships. The poles 36 and 22 also define interpole spaces 40 and 41. The poles 36 or 22 may span the same arcuate distances as the interpole spaces 40 and 41 or they may span different arcuate distances. The poles 36 and 22 and the interpole spaces 40 and 41 do not have a preferred geometry.

A four-pole configuration is shown for the brake mechanism 10. Each of the interpole spaces 40 and 41 and poles 36 and 22 span an arcuate distance of 45 degrees. Although four poles are illustrated for each pole structure 12 and 14, it is understood that the brake mechanism 10 could be configured with a different number of poles.

During operation of the brake mechanism 10, a dc excitation current is supplied to the coil 26. Controlling the amplitude of the excitation current controls the braking and holding torque applied to the shaft 8. The amplitude of the excitation current could be controlled by means such as a potentiometer or a pulse-width modulated switch. For example, the excitation current could be controlled to apply a progressively increasing braking torque to the shaft 8, followed by a constant holding torque.

When an excitation current is supplied to the coil 26, and when the inner and outer poles 36 and 22 area aligned as shown in FIGS. 1 and 2, magnetic flux F travels axially in the upper bridge 28, enters an upper pole structure 16, and then travels radially inward across the air gap G and into a lower pole structure 30 of inner assembly 12. The flux F then travels axially in the inner bridge 38, back through the other inner pole structure 32 of the inner pair, across the magnetic air gap G into the other pole structure 18 of the outer pair and back to the outer bridge 28, thereby completing a magnetic circuit. The illustrated flux path is based on a certain direction of current flow in the coil 26. The position shown in FIG. 1 is a minimum reluctance torque position.

Figure 3:
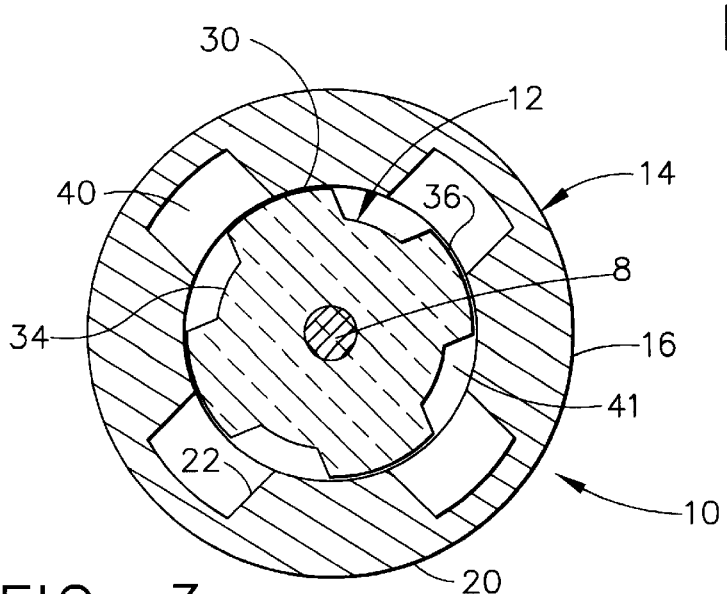
FIG. 3 is another illustration of the brake mechanism with its inner assembly rotated to a maximum reluctance torque position.

FIG. 3, in contrast, shows a peak reluctance torque position of the brake mechanism 10. The peak reluctance torque (negative or positive) for the four-pole configuration occurs when the inner poles 36 are displaced 22.50 degrees from one of the minimum reluctance torque positions.

Figure 4:
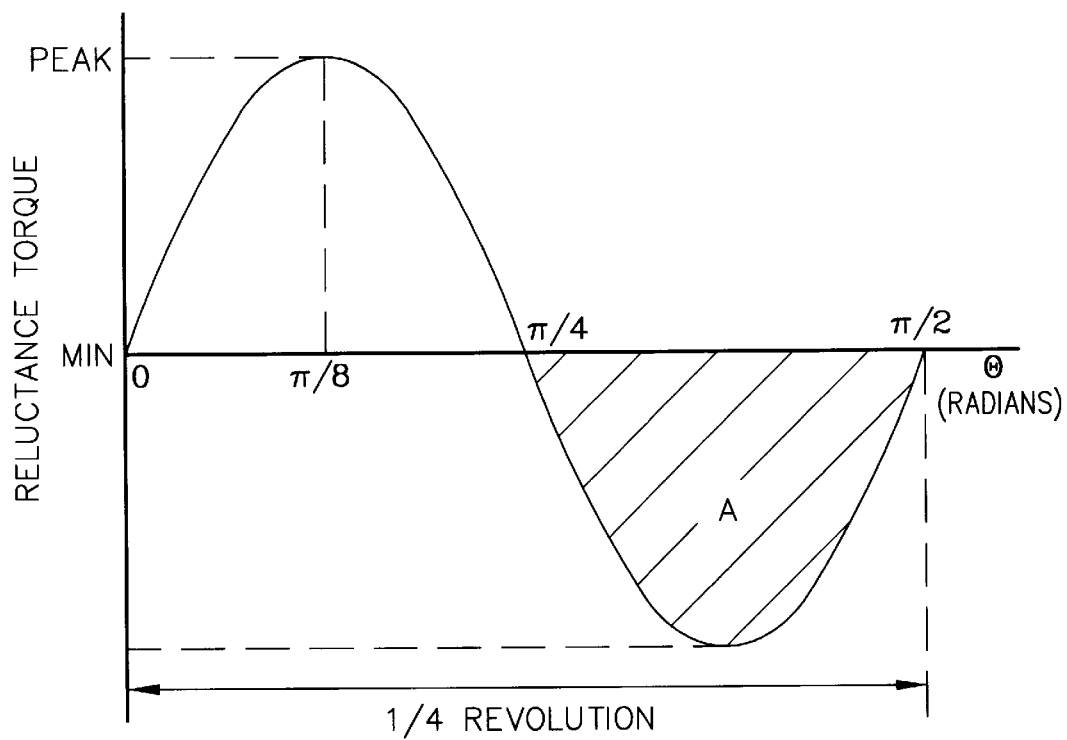
FIG. 4 is an illustration of a torque curve for the brake mechanism shown in FIGS. 1 to 3.

For inner assembly positions θ between the minimum and maximum reluctance torque positions, the reluctance torque will be between the minimum and peak reluctance torques. FIG. 4 shows a plot of reluctance torque to inner assembly position θ. A reluctance torque cycle will occur once every one-quarter of a mechanical revolution of the inner assembly 12. There are eight minimum reluctance torque positions and eight peak reluctance torque positions for the four-pole configuration.

When the inner assembly 12 is rotated by the shaft 8, the strength of the magnetic field within the inner assembly 12 will oscillate. Resulting is a pulsating (non-uniform) magnetic field, which induces eddy currents in the inner assembly 12. The induced eddy currents generate a damping torque that slows down the rotation of the inner assembly 12 until such time the kinetic energy of the inner assembly 12 is reduced sufficiently that it can not overcome the reluctance torque of the brake mechanism 10. This occurs when the kinetic energy of the inner assembly 12 is less than the magnetic energy which equals area A under one half a reluctance torque cycle (see FIG. 4).

In addition to providing a braking force, the brake mechanism 10 can also hold the shaft 8 in place. When the excitation current is supplied to the coil 26, the inner assembly 12 moves to one of the minimum reluctance torque positions. When an attempt is made to rotate the shaft 8, the reluctance torque is increased.

Referring once again to FIGS. 1 and 3, the interpole spaces 40 and 41 may be filled with a non-ferromagnetic material. Filling the interpole spaces 40 and 41 with a material such as plastic will reduce windage losses. Filling the interpole spaces 40 and 41 with a metal such as copper or aluminum will increase braking capacity in addition to reducing windage losses. The flux generates additional eddy currents inside the metal filling the interpole spaces 40 and 41.

Figure 5:
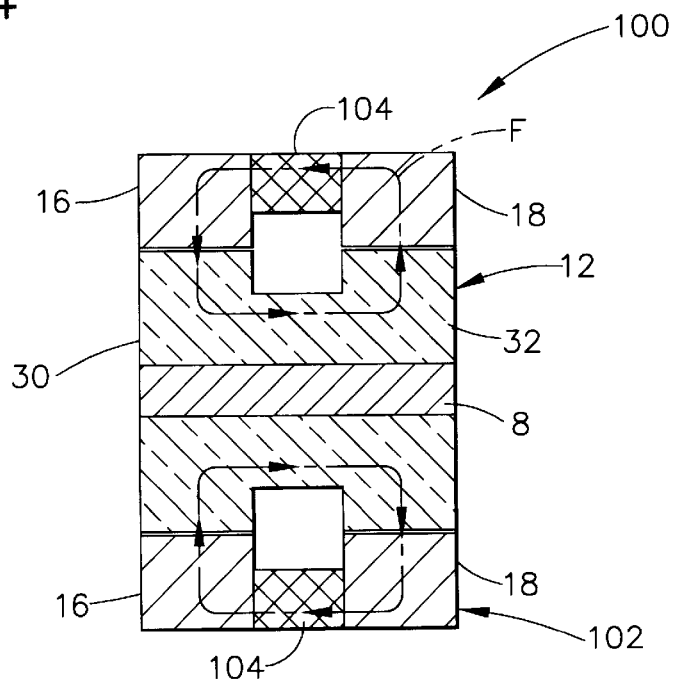
FIG. 5 is an illustration of an alternative embodiment of the brake mechanism.

FIG. 5 shows an alternative embodiment of the brake mechanism (the "second" brake mechanism 100). The outer assembly 102 of the second brake mechanism 100 includes an annular permanent magnet 104 instead of an electromagnet between the outer pole structures 16 and 18. Because the excitation of the permanent magnet 104 is fixed, the pole structures 16, 18, 30 and 32 of the inner and outer assemblies 12 and 102 may be laminated to minimize losses during non-braking running operation.

Figure 6:
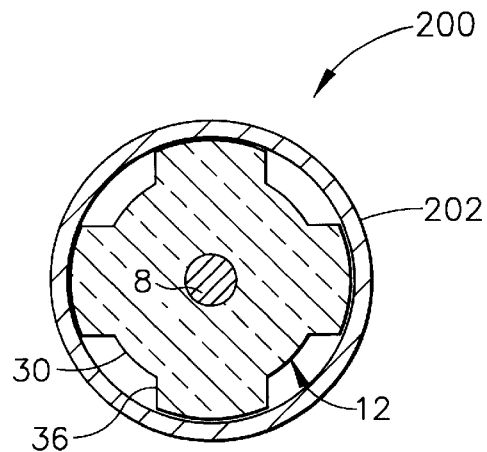
FIG. 6 is an illustration of another alternative embodiment of the brake mechanism.

FIG. 6 shows another alternative embodiment of the brake mechanism (the "third" brake mechanism 200). The third brake mechanism 200 includes an inner assembly 12 surrounded by a cylinder 202 made of a metal such as aluminum or copper. An inner surface of the metal cylinder 202 and outer surfaces of the poles 36 define magnetic air gaps. When the cylinder 202 is rotated relative to the inner assembly 12, eddy currents are generated within the cylinder 202. The eddy currents result in a braking torque. The braking torque can be adjusted by adjusting the excitation current to an electromagnet (not shown) between the inner pole structures (only one of the pole structures 30 being shown).

Thus disclosed are non-contacting brake mechanisms 10, 100 and 200. Because each brake mechanism is non-contacting, problems such as wear and tear of brake parts are eliminated. Consequently, brake maintenance is reduced. Moreover, the brake mechanism 100 including the permanent magnet 104 can be operated without an excitation current.

Figure 7:
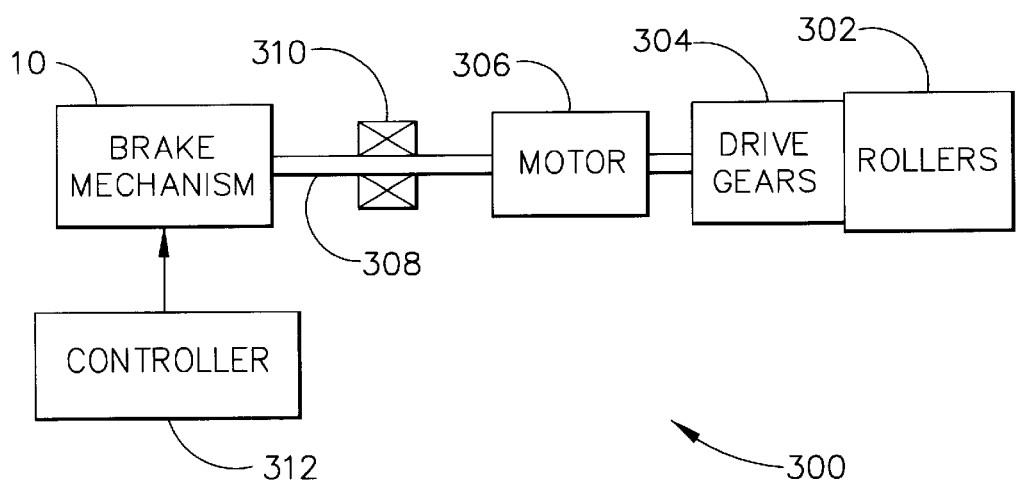
FIG. 7 is a block diagram of a cargo roller assembly including the power drive unit according to the present invention.

The brake mechanisms can be applied to many different systems. One such system is a power drive unit of a cargo roller assembly. The power drive unit 300 shown in FIG. 7 includes at least one roller 302, reduction gears 304 and an electric motor 306. During operation of the power drive unit 300, the electric motor 306 drives the reduction gears 304, which drives at least one of the rollers 302.

The power drive unit 300 further includes the brake mechanism 10 for applying a torque to a shaft 308 of the motor 306. The brake mechanism 10 may be located at an end of the motor shaft 308 (as illustrated) or between the bearings 310 and the motor 306. The inner assembly 12 of the brake mechanism 10 is secured to the motor shaft 308 and the outer assembly 14 of the brake mechanism is secured to a frame (not shown) of the power drive unit 300.

A controller 312 such as a potentiometer or a pulse width modulated switch may be used to adjust the braking/holding torque that is applied to the shaft 308. In the alternative, a controller 312 such as a closed loop control may be used for controlling the excitation current to the electromagnet 24 of the brake mechanism.

The brake mechanism 100 including the permanent magnet 104 could be used instead of the brake mechanism 10 including the electromagnet 24. Consequently, the controller 312 would not be needed since the magnetic excitation would be fixed. The torque of the motor 308 would be high enough to overcome the initial peak reluctance torque.

Either brake mechanism 10 or 100 reduces the chance of bearing contamination because brake debris is not generated. Thus, reliability of the bearings 310 is increased by the use of either brake mechanism 10 or 100 instead of a conventional friction brake.

The invention is not limited to the specific embodiments described and illustrated above. For example, the inner poles may be secured directly to a shaft made of a ferromagnetic material. The outer assembly may be secured to a shaft and the inner assembly may be secured to a frame, whereby the outer assembly is rotatable relative to the inner assembly. Choices of ferromagnetic materials include, but are not limited to, silicon steel and tool steel.

Therefore, the invention is not limited to the specific embodiments described and illustrated above. Instead, the invention is construed according to the claims that follow.

What is claimed is:

1. A brake mechanism comprising:

an inner assembly including a pair of spaced apart inner ferromagnetic pole structures, each inner pole structure including a plurality of inner salient ferromagnetic poles extending radially outwards; and an outer assembly surrounding the inner assembly, the outer assembly including a pair of spaced apart outer ferromagnetic pole structures, each outer pole structure including a plurality of outer salient ferromagnetic poles extending radially inwards towards the inner assembly;

one of the inner and outer assemblies further including a flux source between its pole structure pair;

the other of the inner and outer assemblies further including a ferromagnetic bridge between its pole structure pair;

magnetic air gaps being defined by outer surfaces of the inner and outer poles when the outer surfaces of the inner and outer poles are in opposing relationships.

2. The mechanism of claim 1, wherein the flux source includes a permanent magnet.

3. The mechanism of claim 1, wherein the flux source includes an electromagnet.

4. The mechanism of claim 3, further comprising means for controlling an excitation current supplied to a coil of the electromagnet.

5. The mechanism of claim 1, wherein the assembly including the bridge is made solid.

6. The mechanism of claim 1, wherein the inner assembly is securable to a shaft, whereby the inner assembly is rotatable relative to the outer assembly.

7. The mechanism of claim 1, wherein the poles define interpole spaces, and wherein the interpole spaces are filled with a non-ferromagnetic material.

8. The mechanism of claim 1, wherein the poles define interpole spaces, and wherein the poles and the interpole spaces span equal arcuate distances.

9. An assembly for a non-contacting brake mechanism, the assembly comprising:

a first pole structure including a first ferromagnetic disc and a plurality of first salient ferromagnetic poles extending from the first disc in a radial direction;

a second pole structure including a second ferromagnetic disc and a plurality of second salient ferromagnetic poles extending from the second disc in a radial direction wherein the poles define interpole spaces; and an annular flux source between the first and second pole structures, the annular flux source providing flux between the first and second pole structures.

10. The assembly of claim 9, wherein the first and second discs have inner perimeters, and wherein the first and second poles extend radially inward from the inner perimeters of the first and second discs.

11. The assembly of claim 9, wherein the annular flux source includes an electromagnet.

12. The assembly of claim 9, wherein the annular flux source includes a permanent magnet.

13. The assembly of claim 9, wherein the interpole spaces are filled with a non-ferromagnetic material.

14. The assembly of claim 9, wherein a cylinder surrounds the first and second poles such that an inner surface of the cylinder and outer surfaces of the first and second poles define magnetic air gaps.

15. A power drive unit of a cargo roller assembly, the power drive unit comprising:

a transmission;

an electric motor having a shaft coupled to the transmission; and a brake mechanism, the brake mechanism including an inner assembly secured to the shaft and an outer assembly surrounding the inner assembly, the inner assembly including a pair of inner ferromagnetic pole structures, both inner pole structures including inner salient ferromagnetic poles extending radially outward towards the outer assembly, the inner assembly further including a ferromagnetic bridge between the inner pole structures;

the outer assembly including a pair of outer ferromagnetic pole structures, both outer pole structures including outer salient ferromagnetic poles extending radially inwards towards the inner assembly;

the outer assembly further including a flux source between the outer pole structures;

magnetic air gaps being defined by outer surfaces of the inner and outer poles when the outer surfaces of the inner and outer poles are in opposing relationships.

16. The unit of claim 15, wherein the flux source includes a permanent magnet.

17. The unit of claim 15, wherein the flux source includes an electromagnet.

18. The unit of claim 17, further comprising means for controlling an excitation current supplied to a coil of the electromagnet.

19. The unit of claim 15, wherein the poles define interpole spaces, and wherein the interpole spaces are filled with a non-ferromagnetic material.

20. The unit of claim 15, wherein the poles define interpole spaces, and wherein the poles and the interpole spaces span equal arcuate distances.

* * * * *